(12) United States Patent
Kihara (10) Patent No.: US 8,411,313 B2
(45) Date of Patent: Apr. 2, 2013

(54) IMAGE FORMING APPARATUS AND IMAGE READING METHOD FOR READING AN UNTARGETED PAGE OF AN ORIGINAL

(75) Inventor: Yuka Kihara, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1230 days.

(21) Appl. No.: 12/209,610

(22) Filed: Sep. 12, 2008

(65) Prior Publication Data

US 2009/0074236 A1  Mar. 19, 2009

(30) Foreign Application Priority Data

Sep. 14, 2007 (JP) ................................. 2007-239565
Jan. 7, 2008 (JP) ................................. 2008-000587

(51) Int. Cl.
  *G06K 15/00* (2006.01)
(52) U.S. Cl. ...................... 358/1.18; 358/1.11; 358/1.14; 358/1.16; 358/1.9; 358/462; 358/474; 382/190; 382/198; 382/232
(58) Field of Classification Search ................ 358/3.28, 358/540, 1.11, 1.2, 1.14, 1.16, 1.18, 1.9, 358/426.04, 426.05, 448, 470, 474, 1.7; 715/251
See application file for complete search history.

(56) References Cited

U.S. PATENT DOCUMENTS

2004/0234138 A1* 11/2004 Hsieh ............................ 382/232
2007/0127077 A1*  6/2007 Tamura ......................... 358/3.28

FOREIGN PATENT DOCUMENTS

| JP | 9-179494 | 7/1997 |
|---|---|---|
| JP | 9-186603 | 7/1997 |
| JP | 2000-106624 | 4/2000 |
| JP | 3136061 | 12/2000 |
| JP | 2001-197297 | 7/2001 |
| JP | 2001-238075 | 8/2001 |
| JP | 3373811 | 11/2002 |
| JP | 2005-109719 | 4/2005 |
| JP | 2005-250742 | 9/2005 |
| JP | 2005-303901 | 10/2005 |
| JP | 2006-50611 | 2/2006 |
| JP | 2007-123990 | 5/2007 |

OTHER PUBLICATIONS

English Machine Translation of JP 2005-303901-A (Iwamoto, Published Oct. 27, 2005).*
English Machine Translation of JP 2007-123990-A (Kanetani, Published May 17, 2007).*
Japanese Office Action issued Apr. 24, 2012 in patent application No. 2011-244708.

* cited by examiner

*Primary Examiner* — Benny Q Tieu
*Assistant Examiner* — Juan M Guillermety
(74) *Attorney, Agent, or Firm* — Oblon, Spivak, McClelland, Maier & Neustadt, L.L.P.

(57) ABSTRACT

In an image forming apparatus, a reader reads an image of one page of an original thereby obtaining image data. A determining unit determines whether embedded data has been embedded in the image data. An extracting unit extracts the embedded data, acquires a target page number of a reading unnecessary page based on the embedded data, and saves the page number in a storage unit. A page number determining unit determines whether a page number of a next page of the original matches with the target page number. Upon the page number of the next page matching with the target page number, the reader does not read image data of the next page.

10 Claims, 9 Drawing Sheets

IMAGE FORMING APPARATUS AND IMAGE READING METHOD FOR READING AN UNTARGETED PAGE OF AN ORIGINAL

CROSS-REFERENCE TO RELATED APPLICATIONS

The present application claims priority to and incorporates by reference the entire contents of Japanese priority document 2007-239565 filed in Japan on Sep. 14, 2007 and Japanese priority document 2008-000587 filed in Japan on Jan. 7, 2008.

BACKGROUND OF THE INVENTION

1. Field of the Invention

The present invention relates to a technology for controlling reading of an untargeted page of an original in an image forming apparatus.

2. Description of the Related Art

Recently, spread of personal computers (PC) and the Internet leads to an increase in the amount and types of digital contents that are created. Due to this, a data embedding technology (a digital watermarking technology) is used as one of security control methods of digital sensitive documents that are used over a network. For example, Japanese Patent Application Laid-open No. 2000-106624 discloses a technology for embedding watermark data that cannot be perceived by humans. In the technology, image data is subjected to wavelet transformation, and redundancy of a frequency space is used to embed the watermark data into the image data.

Although realizing the digital watermarking technology in a binary image such as a document image is difficult due to less redundancy in the document image, various methods are known that use characteristics that are specific to the document image. For example, in a method disclosed in Japanese Patent No. 3136061, a base line of lines is moved to embed the watermark data into the document image. Further, in other methods disclosed in Japanese Patent Application Laid-open No. H9-186603, a blank length between words is adjusted to embed the watermark data. Further, in another method disclosed in Japanese Patent No. 3373811, the watermark data is embedded by treating the document image as a black and white binary bitmap image.

The digital content mentioned above is also printed and used as a paper document. Recently, because a high resolution output is enabled using an image forming apparatus such as a printer, various printer friendly data embedding technologies (digital watermarking technologies) have also been suggested. For example, in technologies that are disclosed in Japanese Patent Application Laid-open No. 2001-197297 and Japanese Patent Application Laid-open No. 2001-238075, when outputting content data using the printer, an image as a faint background pattern is overlapped in a background of the content data and output. In an original document (a printed material that is output by the printer), the faint background pattern appears merely as a pattern or a background color to a human eye. However, upon duplicating the original document using a copier, the faint background pattern appears on the duplicated document as predetermined characters. Therefore, actions of a person who has duplicated the original document can be checked similarly as by using a sheet for counterfeit prevention.

Further, in a method that is disclosed in Japanese Patent Application Laid-open No. H9-179494 and used as a digital watermarking method for a black and white binary document that is most widely used as the printed material, data is digitalized and expressed using a distance between a reference point mark and a position distinguishing mark (number of dots).

Thus, the data, which has been embedded using the data embedding technology mentioned earlier, is used as preventive measures for preventing fraudulent duplication or editing of the document. For example, a password can be embedded as the embedded data so that duplication or editing of the document is restricted to an authorized user.

However, in the conventional technologies mentioned above, the embedded data, which has been embedded in the image data itself, is used for protection of the original image such as prevention of unauthorized use, protection of copyrights, or prevention of falsification of data. Therefore, the conventional technologies do not cover a technology for deleting unnecessary image data and maintaining only the minimum necessary image data.

For example, when copying image data, scanning image data, or transmitting image data using a facsimile, it is desirable to omit output of unnecessary image data of unnecessary pages of an original, storage of the unnecessary image data in a memory, or transmission of the unnecessary image data. For preventing the output, storage, or transmission of the unnecessary image data, the user needs to eliminate the unnecessary pages from the original before placing the original in a placing unit, thus putting a significant burden on the user. Further, reading the image data without distinguishing between necessary pages and unnecessary pages results in storage of the unnecessary image data. As a result, a performance of the image forming apparatus such as a multifunction peripheral (MFP) is degraded.

SUMMARY OF THE INVENTION

It is an object of the present invention to at least partially solve the problems in the conventional technology.

According to an aspect of the present invention, there is provided an image forming apparatus that carries out image processing on image data of an original having a plurality of pages allocated with page numbers and includes a placing unit on which the original is placed; a reading unit that reads one page of the original thereby obtaining image data of the page; a first determining unit that determines whether embedded data has been embedded in the image data; an extracting unit that extracts the embedded data from the image data, and acquires, based on the embedded data, a target page number being a page number of a reading unnecessary page that is not to be read by the reading unit; and a second determining unit that determines whether a page number of a next page of the original matches with the target page number, wherein the reading unit does not read image data of the next page when the page number of the next page matches with the target page number.

According to another aspect of the present invention, there is provided a method of image reading that is executed by an image forming apparatus that carries out image processing on image data of an original having a plurality of pages allocated with page numbers. The method includes reading one page of the original thereby obtaining image data of the page; first determining including determining whether embedded data has been embedded in the image data; extracting the embedded data from the image data; acquiring, based on the embedded data, a target page number of a reading unnecessary page that is not to be read at the reading; and second determining including determining whether a page number of a next page matches with the target page number, wherein the reading includes skipping reading of image data of the next page when the page number of the next page matches with the target page number.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. In the embodiments explained below, an image forming apparatus according to the present invention is applied to a multifunction peripheral (MFP) that serve a plurality of functions such as a copier, a facsimile, and a printer. However, the image forming apparatus according to the present invention is not to be limited to the MFP, and the present invention can also be applied to any device such as a copier, a scanner, or a facsimile that reads image data. Further, in the embodiments explained below, the image data that is read from an original is printed on a sheet. However, the present invention is not to be thus limited, and can also be applied when the image data that is read from the original is transmitted by fax or e-mail.

Figure 1:
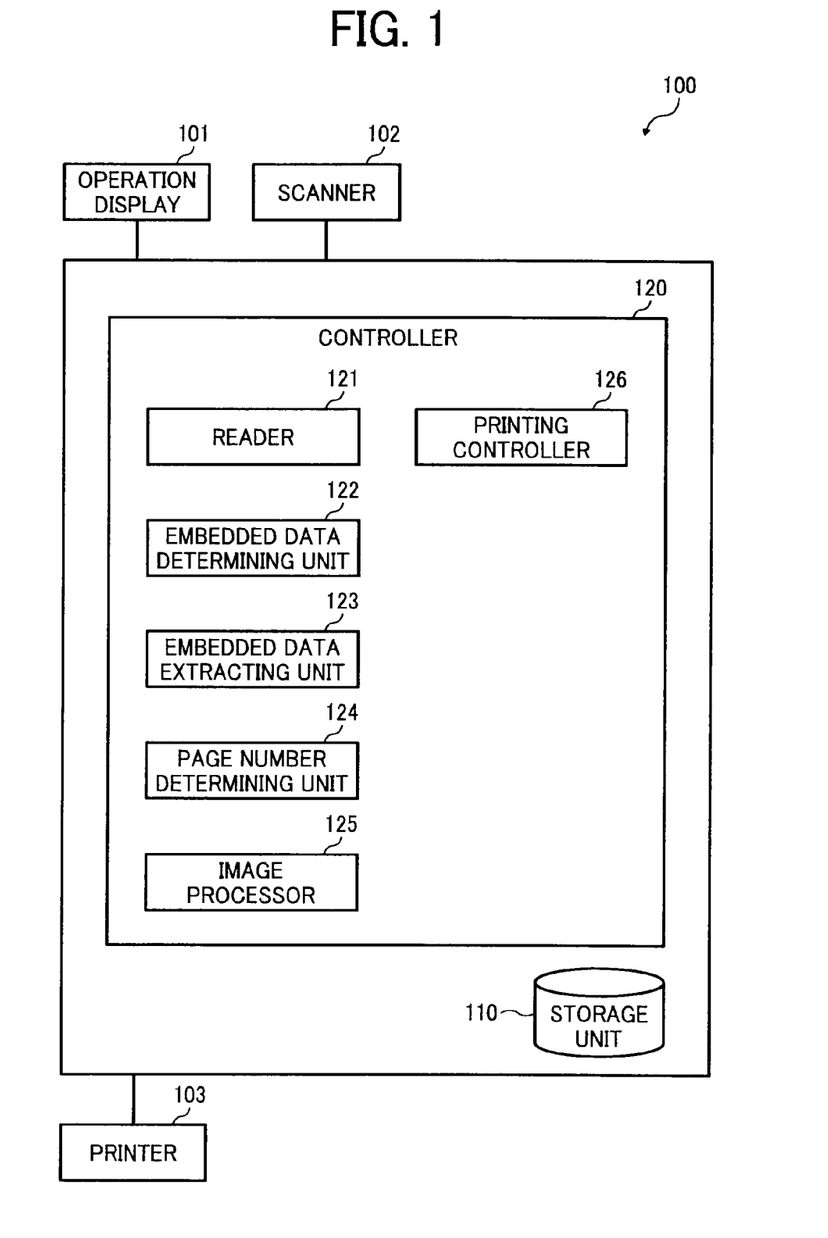
FIG. 1 is a block diagram of an MFP according to a first embodiment of the present invention.

FIG. 1 is a block diagram of an MFP 100 according to a first embodiment of the present invention. The MFP 100 scans an original, generates printing data of image data of the scanned original, and prints the printing data. The MFP 100 includes an operation display 101, a scanner 102, a printer 103, a storage unit 110, and a controller 120. The controller 120 includes a reader 121, an embedded data determining unit 122, an embedded data extracting unit 123, a page number determining unit 124, an image processor 125, and a printing controller 126.

The operation display 101 includes a display (not shown) that can display various screens. The operation display 101 displays, in the display, an input screen for carrying out an input of setting data related to printing. A user carries out the input of the setting data from the displayed input screen and operating keys (not shown).

The scanner 102 includes a placing unit (not shown) for placing the original. The scanner 102 uses a charge-coupled device (CCD) to scan the original that is placed in the placing unit by a user.

The printer 103 prints on the sheet, the printing data that is generated by the image processor 125.

The storage unit 110 stores therein the image data that is read by the reader 121 from the original that is placed by a user. The storage unit 110 is a storage medium such as a hard disk drive (HDD) or a memory. Further, the storage unit 110 stores therein a page number of a reading unnecessary page, from the placed original, that is not required to be read by the reader 121.

The reading unnecessary page indicates a page, of the original, that is determined in advance by a user as not necessary to be read because the user does not desire to print that page. The page number indicates a sequence number, in the original that is placed by the user, such that a page that is initially read by the reader 121 is treated as the first page and the subsequent pages are sequentially numbered as the second page, the third page and so on. In other words, if the user has placed the original having ten pages, the page number of the initial page is "1", the page number of the fifth page is "5", and the page number of the last page is "10".

The reader 121 controls the scanner 102 to read image data of one page of the original that is placed in the placing unit thereby obtaining image data of the page, and saves the read image data in the storage unit 110. Further, upon the page number determining unit 124 determining that a page number of a next page of the original that is placed in the placing unit matches with the page number of the reading unnecessary page that is stored in the storage unit 110, the reader 121 does not read the image data of the next page.

The embedded data determining unit 122 determines whether embedded data, which includes data of the page number of the reading unnecessary page, has been embedded in the image data that is read by the reader 121. The embedded data is a specific data in the original. The embedded data has been embedded in the image data using a technology such as digital watermarking along with data that is to be printed.

A method of determining whether the embedded data has been embedded in the image data is explained below. For example, it is assumed that data of the original is separated into a plurality of rectangular areas of random sizes and that 64-bit embedded data is to be embedded into each of the multiple rectangular areas. If a size of the embedded data is 64 bits, character data of eight bytes (eight characters) is embedded as one byte for one character. By treating each bit as OFF (binary "0") or ON (binary "1"), a character code is binary embedded into the respective 64 bits as character data (character code) of eight bytes of the embedded data. Next, the embedded data determining unit 122 calculates, for each bit of all the rectangular areas, whether "0" (OFF) or "1" (ON) included in a code of the embedded data, is embedded in each bit of each rectangular area. In other words, the embedded data determining unit 122 counts the number of "1" and the number of "0" in the first bit of all the rectangular areas, the number of "1" and the number of "0" in the second bit of all the rectangular areas, and so on to count and to calculate the number of "1" and the number of "0" in the respective 64 bits of all the rectangular areas. Next, in each bit, if the number of "0" and the number of "1" are exceeding a predetermined threshold value, the embedded data determining unit 122 determines that 0 or 1 is embedded as the embedded data.

In the example described above, the character code corresponding to a page number of a reading unnecessary page is embedded into any of the rectangular areas. However, a method to embed the embedded data and to determine whether the embedded data has been embedded is not to be limited to those described above, and any method that uses digital watermarking technology can be used.

As described above, if the numbers of "0" and "1" in each bit of all the 64 bits of all the rectangular areas exceed the predetermined threshold value (for example, 20000), the embedded data determining unit 122 determines a result as "embedded data is present". If the number of "0" or "1" in any one of the bits does not exceed the predetermined threshold value, the embedded data determining unit 122 determines the result as "embedded data is absent". If an error correcting code is used, whether the embedded data is present can be determined without restoring all the bits. When using the error correcting code, whether the embedded data is present is determined from a restored bit count based on a restorable minimum bit count.

When the embedded data determining unit 122 determines that the embedded data has been embedded in the read image data, the embedded data extracting unit 123 extracts the embedded data from the image data by using a digital watermarking technology. Next, the embedded data extracting unit 123 analyzes the extracted embedded data, retrieves the page number of the reading unnecessary page that is indicated by the embedded data, and saves the retrieved page number in the storage unit 110. In the example mentioned above in which the embedded data has been embedded into the rectangular areas, the embedded data extracting unit 123 reads the embedded data (in other words, a bit sequence of "0" and "1") that has been embedded in the rectangular areas of 64 bits, treats the embedded data as a hexadecimal character code of eight characters, and retrieves the character code as the page number.

If the next page of the original is placed in the placing unit, the page number determining unit 124 compares a page number of the next page, which is a page sequence from the initial page, with the page number of the reading unnecessary page that is stored in the storage unit 110 and determines whether the page number of the next page and the page number of the reading unnecessary page are matching. Whether the next page is placed in the placing unit can be determined based on whether a sensor (not shown) has detected the original that is placed at a predetermined position.

The image processor 125 carries out image processing on the image data that is read from the original and carries out a process to generate the printing data to be printed by the printer 103.

The printing controller 126 controls the printer 103 to print the printing data that is generated by the image processor 125.

Figure 2:
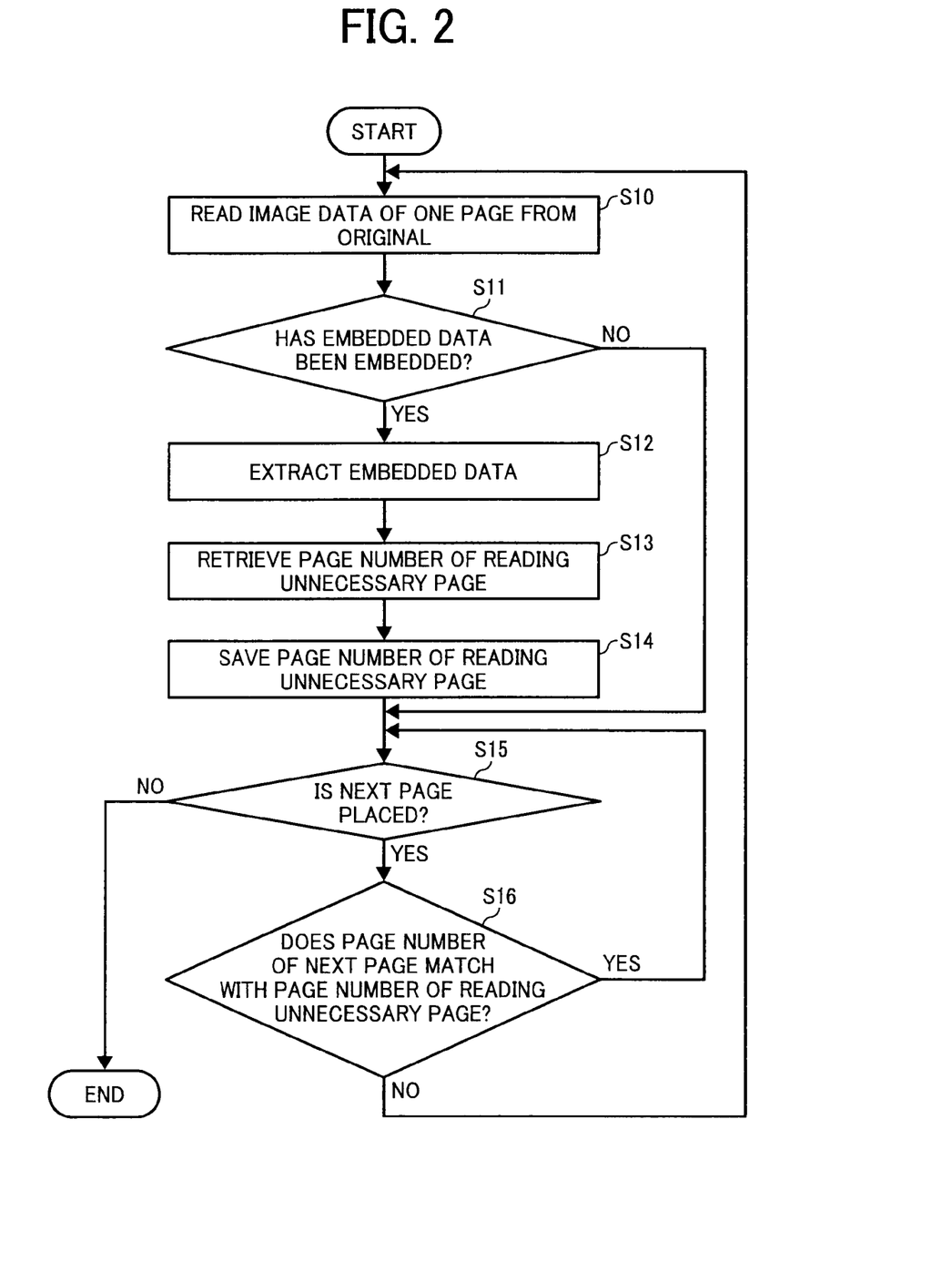
FIG. 2 is a flowchart of an image data reading process performed by the MFP shown in FIG. 1.

A reading process of the image data performed by the MFP 100 is explained below. FIG. 2 is a flowchart of an image data reading process performed by the MFP 100.

The reader 121 reads the image data of one page of the original that is placed in the placing unit thereby obtaining image data of the page (Step S10). The embedded data determining unit 122 determines whether the embedded data has been embedded in the read image data (Step S11).

If the embedded data has been embedded in the read image data (Yes at Step S11), the embedded data extracting unit 123 extracts the embedded data from the image data (Step S12). The embedded data extracting unit 123 acquires the page number of the reading unnecessary page from the extracted embedded data (Step S13), and saves the acquired page number in the storage unit 110 (Step S14). If the embedded data has not been embedded in the image data (No at Step S11), processes at steps S12 to S14 are not executed and process control proceeds to step S15.

The page number determining unit 124 determines whether the next page of the original is placed in the placing unit (Step S15). If the next page is not placed in the placing unit (No at Step S15), process control ends.

If the next page is placed in the placing unit (Yes at Step S15), the page number determining unit 124 determines whether the page number of the next page matches with the page number of the reading unnecessary page that is stored in the storage unit 110 (Step S16). If the page number of the next page does not match with the page number of the reading unnecessary page (No at Step S16), because the next page is a reading necessary page, the process control returns to step S10 at which the reader 121 reads the image data of the next page.

If the page number of the next page matches with the page number of the reading unnecessary page (Yes at Step S16), because the next page is the reading unnecessary page, the reader 121 does not read the next page, and process control proceeds to step S15 at which the page number determining unit 124 determines whether the subsequent page of the original is placed in the placing unit.

The image processor 125 generates the printing data from the image data that is read from the original and the printing controller 126 controls the printer 103 to print the printing data on the sheet.

Thus, in the image reading process mentioned above, the image data corresponding to the page number of the reading unnecessary page in the original placed in the placing unit is not read. This process is effective when both the surfaces of the original include images and printing of only a front surface is desired but printing of a back surface is not desired.

According to the first embodiment, the MFP 100 extracts the embedded data from the image data and retrieves the page number of the reading unnecessary page from the embedded data. If the page number of the next page of the original matches with the page number of the reading unnecessary page, the MFP 100 does not read the next page because the next page is the reading unnecessary page. Accordingly, when printing only necessary pages of the original, it is not necessary to manually eliminate the reading unnecessary pages from the original. Therefore, work efficiency of the user can be enhanced. Furthermore, only image data of the necessary pages are to be read. Therefore, a performance of the MFP 100 can be enhanced.

The MFP 100 according to the first embodiment constantly determines whether the embedded data has been embedded in the image data that is read from the original. However, upon determining that all the embedded data are extracted, an MFP according to a second embodiment of the present invention does not determine whether the embedded data has been embedded in image data of subsequent pages of the original.

Figure 3:
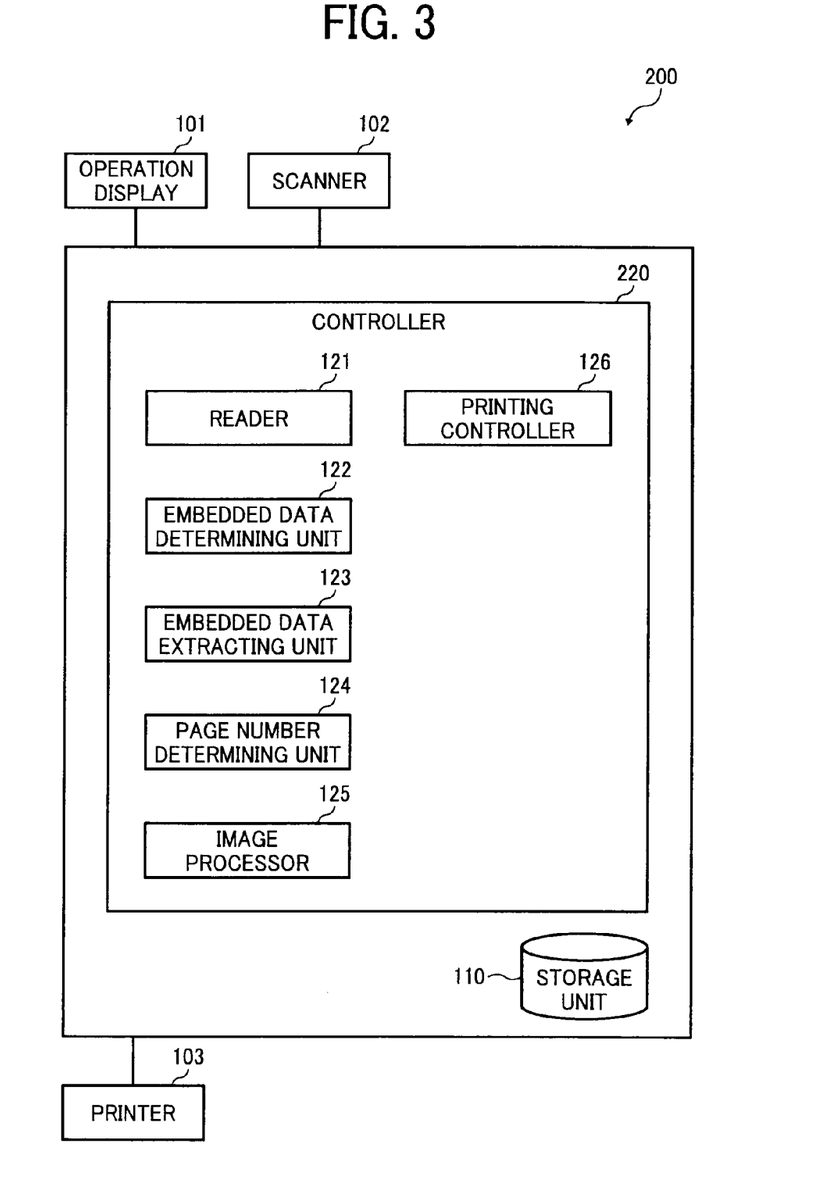
FIG. 3 is a block diagram of an MFP according to a second embodiment of the present invention.

FIG. 3 is a block diagram of an MFP 200 according to the second embodiment. The MFP 200 scans the original, generates the printing data from the scanned original, and prints the printing data. The MFP 200 includes the operation display 101, the scanner 102, the printer 103, the storage unit 110, and a controller 220. The controller 220 includes the reader 121, an embedded data determining unit 222, the embedded data extracting unit 123, the page number determining unit 124, the image processor 125, and the printing controller 126.

Structures and functions of the operation display 101, the scanner 102, the printer 103, and the storage unit 110 is similar to those described in the first embodiment, and therefore the same explanation is not repeated. Further, structures and functions of the reader 121, the embedded data extracting unit 123, the page number determining unit 124, the image processor 125, and the printing controller 126 are also similar to those described in the first embodiment, and therefore, the same explanation is not repeated.

The embedded data determining unit 222 determines whether the embedded data, including data of the page number of the reading unnecessary page, has been embedded in the image data that is read by the reader 121. The embedded data determining unit 222 uses a similar method as that described in the first embodiment to determine whether the embedded data has been embedded in the image data.

Based on a content of the embedded data, the embedded data determining unit 222 determines whether all the embedded data with respect to the placed original are extracted. In other words, for example, if the embedded data, which is embedded into the image data of M-th page that is read by the reader 121, includes data indicating that "embedded data has not been embedded in pages after the (M+1)-th page", the embedded data determining unit 222 determines that all the embedded data are extracted. Upon determining that all the embedded data are extracted, the embedded data determining unit 222 does not determine whether the embedded data has been embedded in the image data of subsequent pages of the original read by the reader 121. In other words, the embedded data determining unit 222 can skip processing of a determination of whether the embedded data has been embedded in image data of pages of the originals after the (M+1)-th page.

Figure 4:
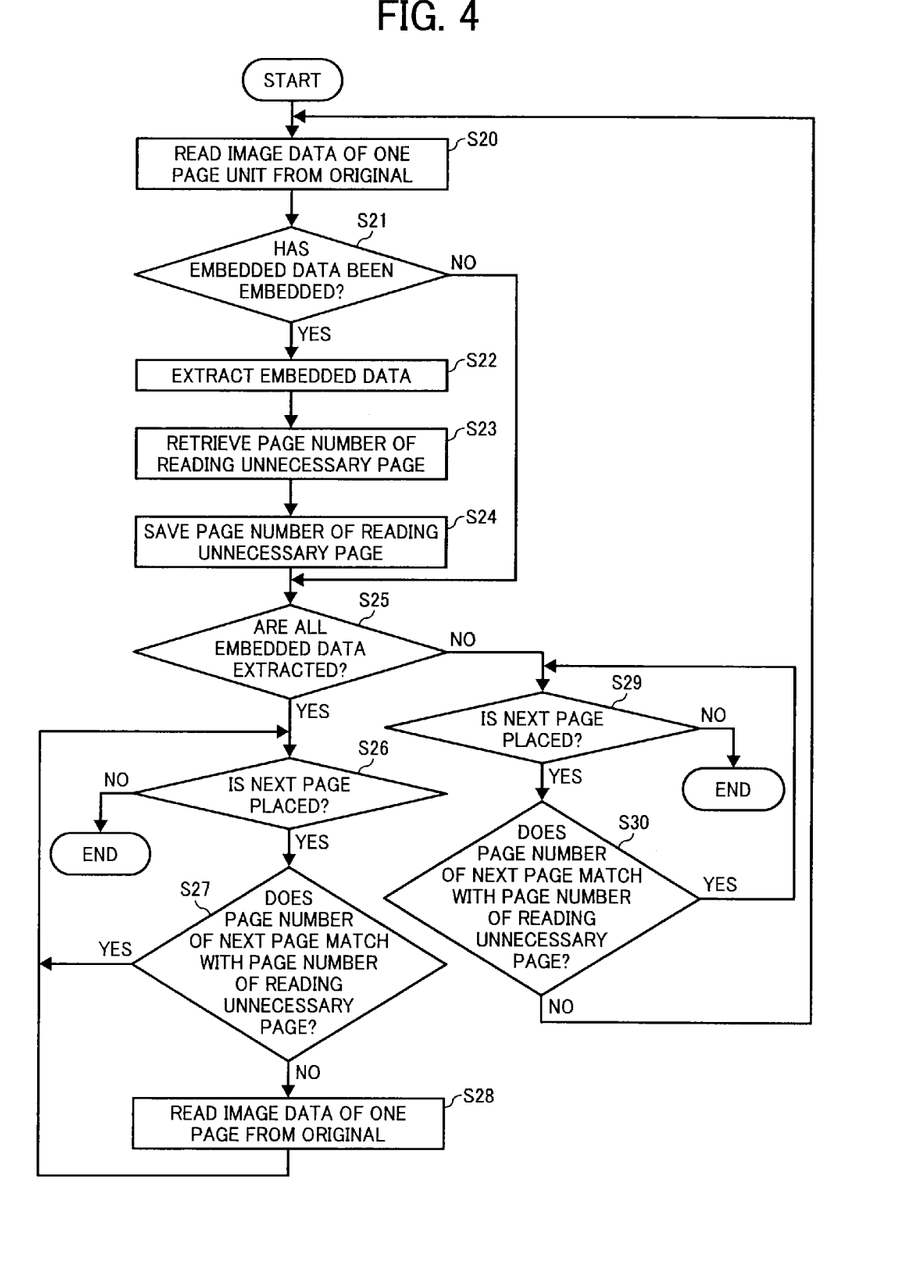
FIG. 4 is a flowchart of an image data reading process performed by the MFP shown in FIG. 4.

A reading process of the image data performed by the MFP 200 is explained below. FIG. 4 is a flowchart of an image data reading process performed by the MFP 200.

Because processes from reading of the image data by the reader 121 to saving of the page number by the embedded data extracting unit 123 (Steps S20 to S24) are similar to those in the first embodiment (see Steps S10 to S14), the same explanation is not repeated.

The embedded data determining unit 222 determines whether all the embedded data are extracted (Step S25). Upon the embedded data determining unit 222 determining that all the embedded data are extracted (Yes at Step S25), the page number determining unit 124 determines whether the next page is placed in the placing unit (Step S26). If the next page is not placed in the placing unit (No at Step S26), process control ends.

If the next page is placed in the placing unit (Yes at Step S26), the page number determining unit 124 determines whether the page number of the next page matches with the page number of the reading unnecessary page that is stored in the storage unit 110 (Step S27). If the page number of the next page does not match with the page number of the reading unnecessary page (No at Step S27), because the next page is the reading necessary page, the reader 121 reads the image data of the next page (Step S28). Because all the embedded data are already extracted, it is not necessary to determine whether the embedded data has been embedded in the read image data. Therefore, process control returns to step S26 at which the page number determining unit 124 determines whether a subsequent page of the original is placed in the placing unit.

If the page number of the next page matches with the page number of the reading unnecessary page (Yes at Step S27), because the next page is the reading unnecessary page, process control returns to step S26 and the page number determining unit 124 determines whether a subsequent page of the original is placed in the placing unit.

Upon the embedded data determining unit 222 determining that all the embedded data are not extracted (No at Step S25), the page number determining unit 124 determines whether the next page is placed in the placing unit (Step S29). If the next page is not placed in the placing unit (No at Step S29), process control ends.

If the next page is placed in the placing unit (Yes at Step S29), the page number determining unit 124 determines whether the page number of the next page matches with the page number of the reading unnecessary page that is stored in the storage unit 110 (Step S30). If the page number of the next page does not match with the page number of the reading unnecessary page (No at Step S30), because the next page is the reading necessary page, process control proceeds to step S20 at which the reader 121 reads the image data of the next page.

If the page number of the next page matches with the page number of the reading unnecessary page (Yes at Step S30), because the next page is the reading unnecessary page, the reader 121 does not read the next page, process control returns to step S29 at which the page number determining unit 124 determines whether the subsequent page of the original is placed in the placing unit.

The image processor 125 generates the printing data from the image data that is read from the original and the printing controller 126 controls the printer 103 to print the printing data on the sheet.

Thus, the MFP 200 extracts the embedded data from the image data, and retrieves the page number of the reading unnecessary page from the embedded data. If the page number of the next page matches with the page number of the reading unnecessary page, because the next page is the reading unnecessary page, the MFP 200 does not read the next page. Accordingly, when printing only necessary pages of the original, it is not necessary to manually eliminate the reading unnecessary pages from the original. Therefore, work efficiency of the user can be enhanced. Furthermore, only the image data of the necessary pages are read, thus enhancing a performance of the MFP 200.

Further, for the embedded data that is extracted from any image data, upon determining that all the embedded data are extracted, the MFP 200 does not determine whether the embedded data has been embedded in the image data of subsequent pages of the original. Therefore, a determination of whether the embedded data has been embedded can be omitted. Thus, the reading process of the original can be executed more efficiently. In other words, for example, if the original having a plurality of pages are placed in the placing unit and the embedded data has been embedded only in the first page of the original, a determination of whether the embedded data has been embedded in all subsequent pages from the second page onwards can be omitted.

The MFP 100 according to the first embodiment acquires the page number of the reading unnecessary page from the embedded data that has been embedded in the image data that is read from the original, and does not read the image data from the page of the retrieved page number. An MFP according to a third embodiment of the present invention deletes the image data corresponding to the page number of the reading unnecessary page from the read image data.

Figure 5:
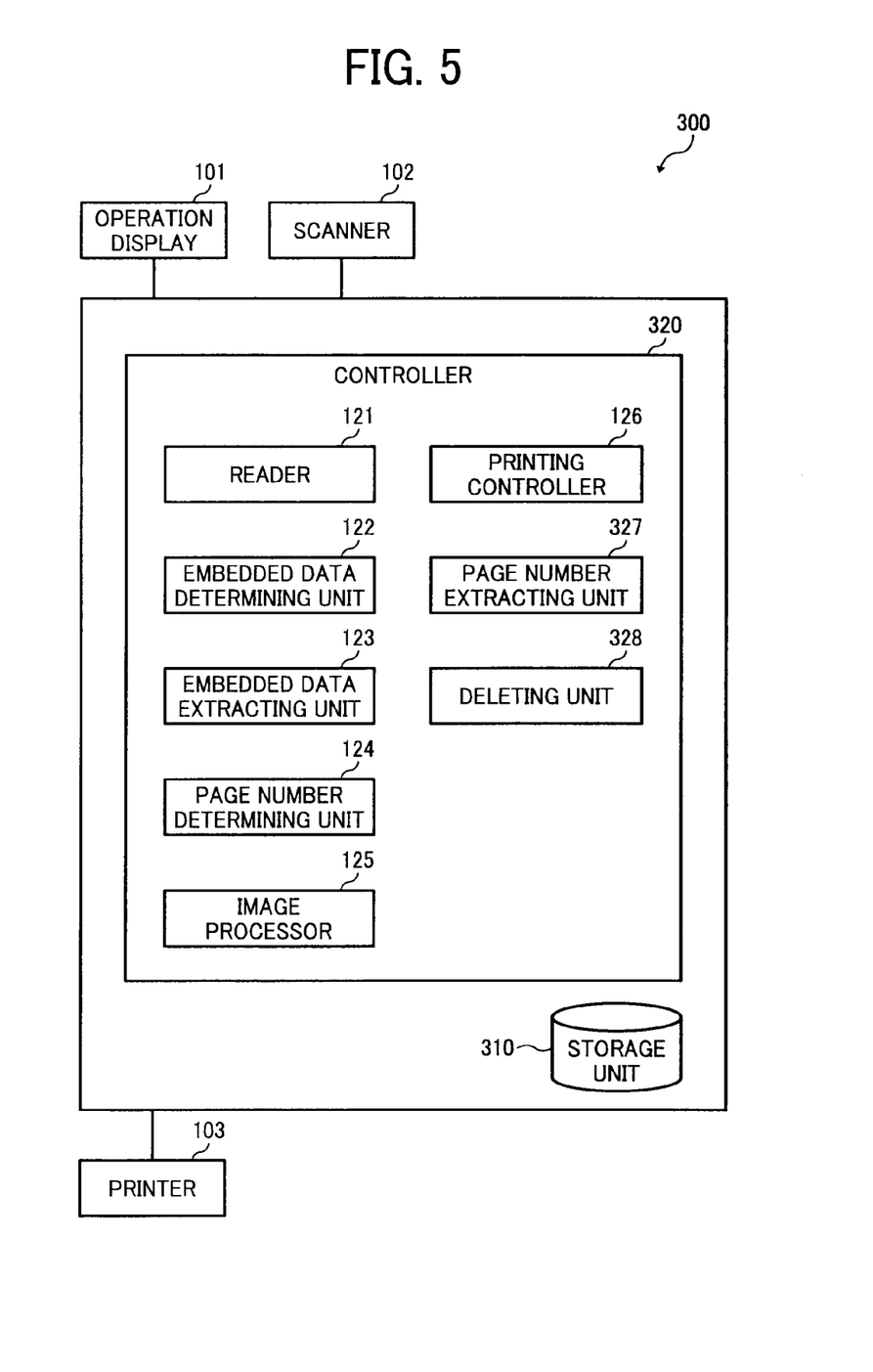
FIG. 5 is a block diagram of an MFP according to a third embodiment of the present invention.

FIG. 5 is a block diagram of an MFP 300 according to the third embodiment. The MFP 300 scans the original, generates the printing data from the scanned original, and prints the printing data. The MFP 300 includes the operation display 101, the scanner 102, the printer 103, a storage unit 310, and a controller 320. The controller 320 includes the reader 121, the embedded data determining unit 122, the embedded data extracting unit 123, the page number determining unit 124, the image processor 125, the printing controller 126, a page number extracting unit 327, and a deleting unit 328.

Structures and functions of the operation display 101, the scanner 102, and the printer 103 are similar to those described in the first embodiment, and therefore, the same explanation is not repeated. Further, structures and functions of the reader 121, the embedded data determining unit 122, the embedded data extracting unit 123, the page number determining unit 124, the image processor 125, and the printing controller 126 are also similar to those described in the first embodiment, and therefore, the same explanation is not repeated.

The page number extracting unit 327 extracts the page number of the read page of the original from the image data that is read by the reader 121, establishes a correspondence between the extracted page number and the read image data, and saves the correspondence in the storage unit 310. The page number, which is a sequence number of a page of the original to be read by the reader 121 in that order, is added at any position in each page of the original. In other words, because pages of an original are generally read in a sequence corresponding to an order of the page number, the page number extracting unit 327 sequentially extracts the page number of the read page as "1", "2", "3", and so on. However, if pages of the original arranged in an incorrect sequence are placed in the placing unit, a reading sequence of the pages differs from the page numbers and the page number extracting unit 327 extracts the page number of the read original in a sequence such as "1", "3", "2", and so on.

The deleting unit 328 acquires, at a predetermined timing, the page number of the reading unnecessary page that is stored in the storage unit 310. If the image data that is stored in the storage unit 310 includes the image data that corresponds to the same page number as the page number of the acquired reading unnecessary page, the deleting unit 328 deletes the image data from the storage unit 310. The predetermined timing can be a random timing such as when reading of all the pages of the original is completed or after each reading completion of ten pages. In the third embodiment, the predetermined timing corresponds to a timing at which reading of all the pages is completed.

Figure 6:
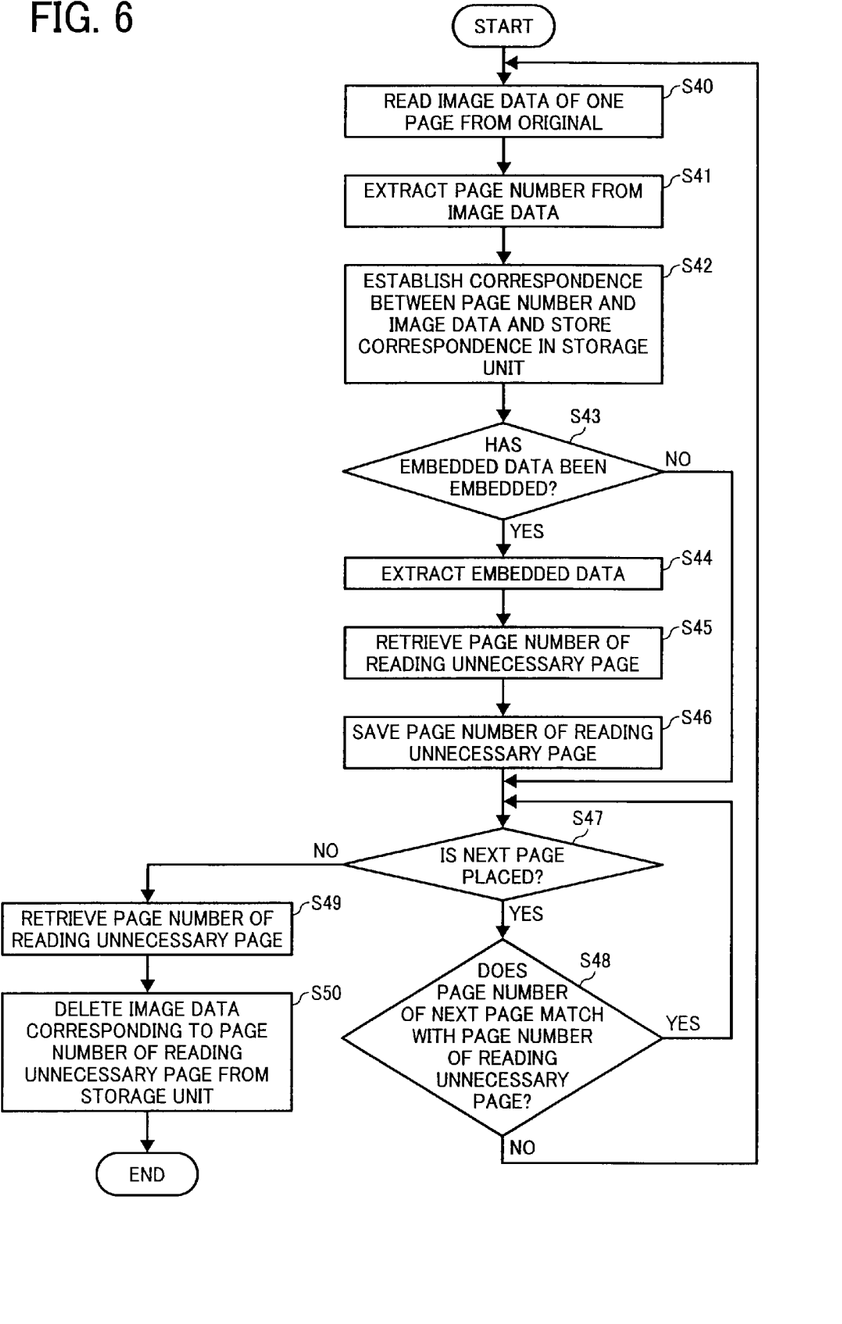
FIG. 6 is a flowchart of an image data deleting process performed by the MFP shown in FIG. 5.

A deletion process performed by the MFP 300 is explained next. FIG. 6 is a flowchart of an image data deleting process performed by the MFP 300.

First, the reader 121 reads an image of one page of the original that is placed in the placing unit thereby obtaining image data of the page (Step S40). The page number extracting unit 327 extracts the page number of the read image data from the read image data (Step S41), establishes a correspondence between the extracted page number and the read image data, and stores the correspondence in the storage unit 310 (Step S42).

Processes from determining, by the embedded data determining unit 122, whether the embedded data has been embedded to saving of the page number (Steps S43 to S46) are similar to those described in the first embodiment (see Steps S12 to S14), and therefore, the same explanation is not repeated.

The page number determining unit 124 determines whether a next page of the original is placed in the placing unit (Step S47). If the next page is placed in the placing unit (Yes at Step S47), the page number determining unit 124 determines whether the page number of the next page matches with the page number of the reading unnecessary page that is stored in the storage unit 310 (Step S48). If the page number of the next page does not match with the page number of the reading unnecessary page (No at Step S48), because the next page is the reading necessary page, process control proceeds to step S40 at which the reader 121 reads image data of the next page.

If the page number of the next page matches with the page number of the reading unnecessary page (Yes at Step S48), because the next page is the reading unnecessary page, the reader 121 does not read the next page, and process control returns to step S47 at which the page number determining unit 124 determines whether the subsequent page of the original is placed in the placing unit.

Returning to step S47, if the next page is not placed in the placing unit (No at Step S47), because reading of all the pages is completed, the deleting unit 328 retrieves the page number of the reading unnecessary page that is stored in the storage unit 310 (Step S49). If the image data that is stored in the storage unit 310 includes image data corresponding to the retrieved page number of the reading unnecessary page, the deleting unit 328 deletes the image data from the storage unit 310 (Step S50).

The image processor 125 generates the printing data from the image data that is read from the original and the printing controller 126 controls the printer 103 to print the printing data on the sheet.

For example, the deleting unit 328 deletes image data from the storage unit 310 in the following situation. First, when reading a page of the original, the MFP 300 retrieves the page number of the reading unnecessary page from the embedded data that has been embedded in image data of the read page and skips a process of reading of the reading unnecessary page (see Steps S43 to S48). Assuming that the embedded data indicates that the fifth page is the reading unnecessary page and this embedded data has been embedded in the third page of the original. When pages of the original arranged in an incorrect sequence are placed in the placing unit and the fifth page is read before the third page, upon reading the third page, even if data indicating that "the fifth page is not to be read" has been extracted from the third page, a process of skipping of reading the fifth page cannot be executed because the fifth page has been already read. In such a situation, the deleting unit 328 deletes from the storage unit 310, the image data of the fifth page that has been already read.

The process mentioned above can be effectively applied to a process carried out after temporarily saving the image data in the storage unit 310, such as a sort copying process, a copying reservation process, or a fax transmission process, in which the read image data is sequentially saved in the storage unit 310 and subjected to a subsequent process. For example, when carrying out sort copying, after deleting the unnecessary image data that is saved in the storage unit 310, only the necessary image data can be printed. When carrying out fax transmission, after deleting the unnecessary image data that is saved in the storage unit 310, only the necessary image data can be transmitted to a destination.

Thus, the MFP 300 extracts the embedded data that has been embedded in the image data and retrieves the page number of the reading unnecessary page. If the page number of the next page matches with the page number of the reading unnecessary page, because the next page is the reading unnecessary page, the MFP 300 does not read the next page. Accordingly, when printing only necessary pages of the original, the operation to select only the necessary pages can be omitted. Therefore, work efficiency of the user can be enhanced. Furthermore, only the image data of the necessary pages is read, thus enhancing a performance of the MFP 300.

Further, if the read image data includes the image data corresponding to the page number of the reading unnecessary page, the MFP 300 deletes the image data from the storage unit 310, thereby further enhancing the performance at the time of printing.

In the third embodiment, after reading of all the originals is completed, the image data, among the read image data, corresponding to the page number of the reading unnecessary page is deleted. If a free storage capacity is not available in the storage unit 310, an MFP according to a fourth embodiment of the present invention deletes the image data corresponding to the page number of the reading unnecessary page from the read image data.

Figure 7:
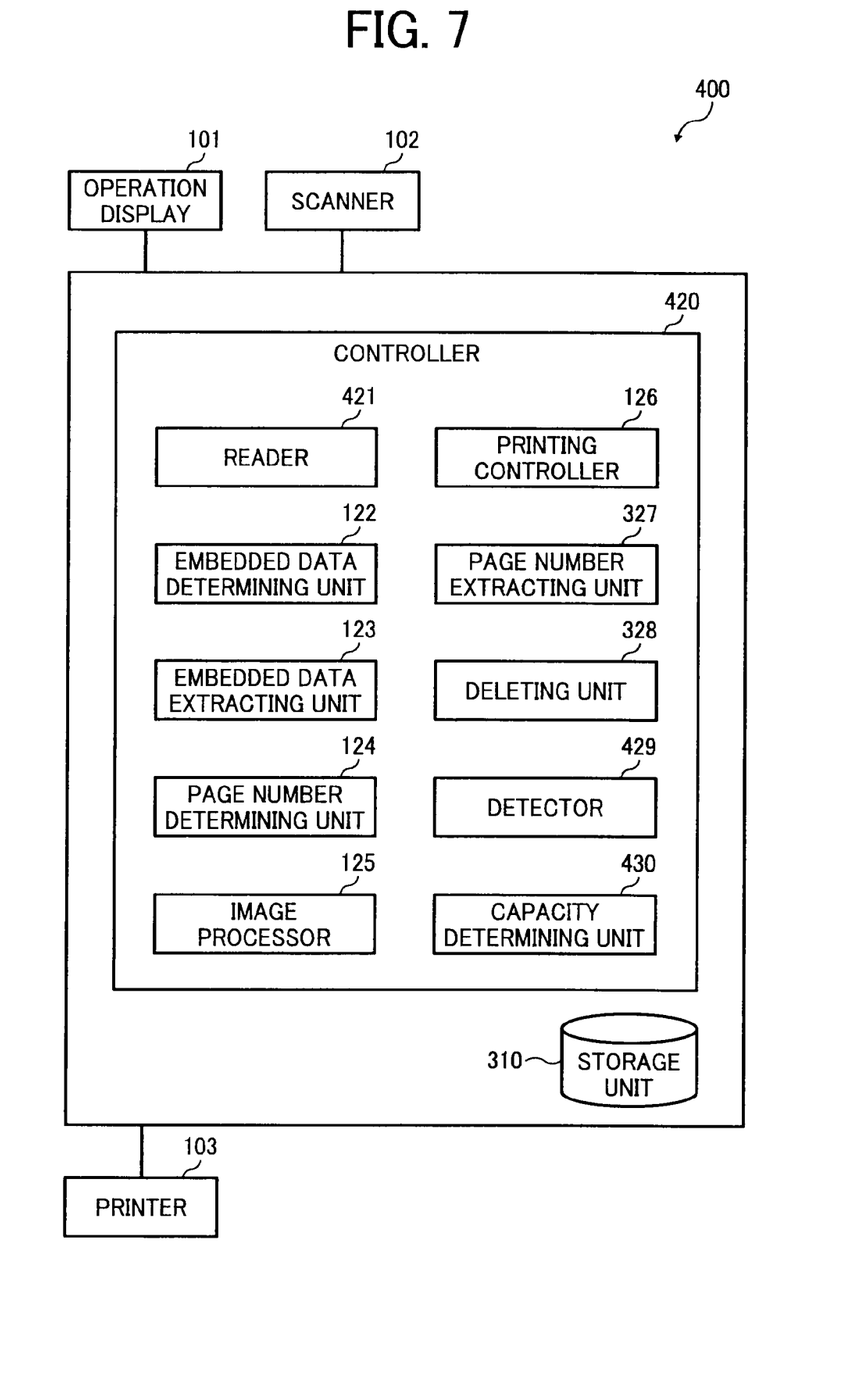
FIG. 7 is a block diagram of an MFP according to a fourth embodiment of the present invention.

FIG. 7 is a block diagram of an MFP 400 according to the fourth embodiment. The MFP 400 scans the original, generates the printing data from the image data of the scanned original, and prints the printing data. The MFP 400 mainly includes the operation display 101, the scanner 102, the printer 103, the storage unit 310, and a controller 420. The controller 420 mainly includes a reader 421, the embedded data determining unit 122, the embedded data extracting unit 123, the page number determining unit 124, the image processor 125, the printing controller 126, the page number extracting unit 327, the deleting unit 328, a detector 429, and a capacity determining unit 430.

Structures and functions of the operation display 101, the scanner 102, and the printer 103 are similar to those described in the third embodiment, and therefore, the same explanation is not repeated. Further, structures and functions of the embedded data determining unit 122, the embedded data extracting unit 123, the page number determining unit 124, the image processor 125, the printing controller 126, the page number extracting unit 327, and the deleting unit 328 are similar to those described in the third embodiment, and therefore, the same explanation is not repeated.

The reader 421 controls the scanner 102 to read an image of one page of the original that is placed in the placing unit thereby obtaining image data of the page, and saves the read image data in the storage unit 310. Further, upon the page number determining unit 124 determining that the page number of the next page of the original matches with the page number of the reading unnecessary page that is stored in the storage unit 310, the reader 421 does not read the image data of the next page.

Further, the reader 421 can switch a process depending on the free storage capacity (remaining capacity) of the storage unit 310. In other words, if the free storage capacity of the storage unit 310 is small, the reader 421 can execute a reading process so that a size of the image data is reduced. For example, the reader 421 performs a process of reading of the original depending on whether the original is a monochromatic image or a color image, the reader 421. In other words, if the original is the monochromatic image, the reader 421 executes a binary reading process of the original. If the original is the color image, because an image data size necessary for executing a multivalued reading process of the original is large, the reader 421 executes the multivalued reading process when the free storage capacity of the storage unit 310 is large. Further, because the image data size necessary for executing the binary reading process of the original is small, the reader 421 forcibly executes, regardless of whether the original is the color image or the monochromatic image, the binary reading process of the original when the free storage capacity of the storage unit 310 is small. In the fourth embodiment, a process such as the multivalued reading process, which is executed when a data size to be processed is large, is called a process A. A process such as the binary reading process, which is executed when a data size to be processed is small, is called a process B.

The detector 429 detects a size of the original that is placed in the placing unit. For example, the detector 429 is a sensor that detects the presence of the original based on a change in received light amount of infrared light.

The capacity determining unit 430 determines whether the free storage capacity of the storage unit 310 is larger than the image data size corresponding to the size of the original that is detected by the detector 429. A data capacity corresponding to predetermined sizes of the original such as an A4 size or a B4 size is prior fixed.

Figure 8:
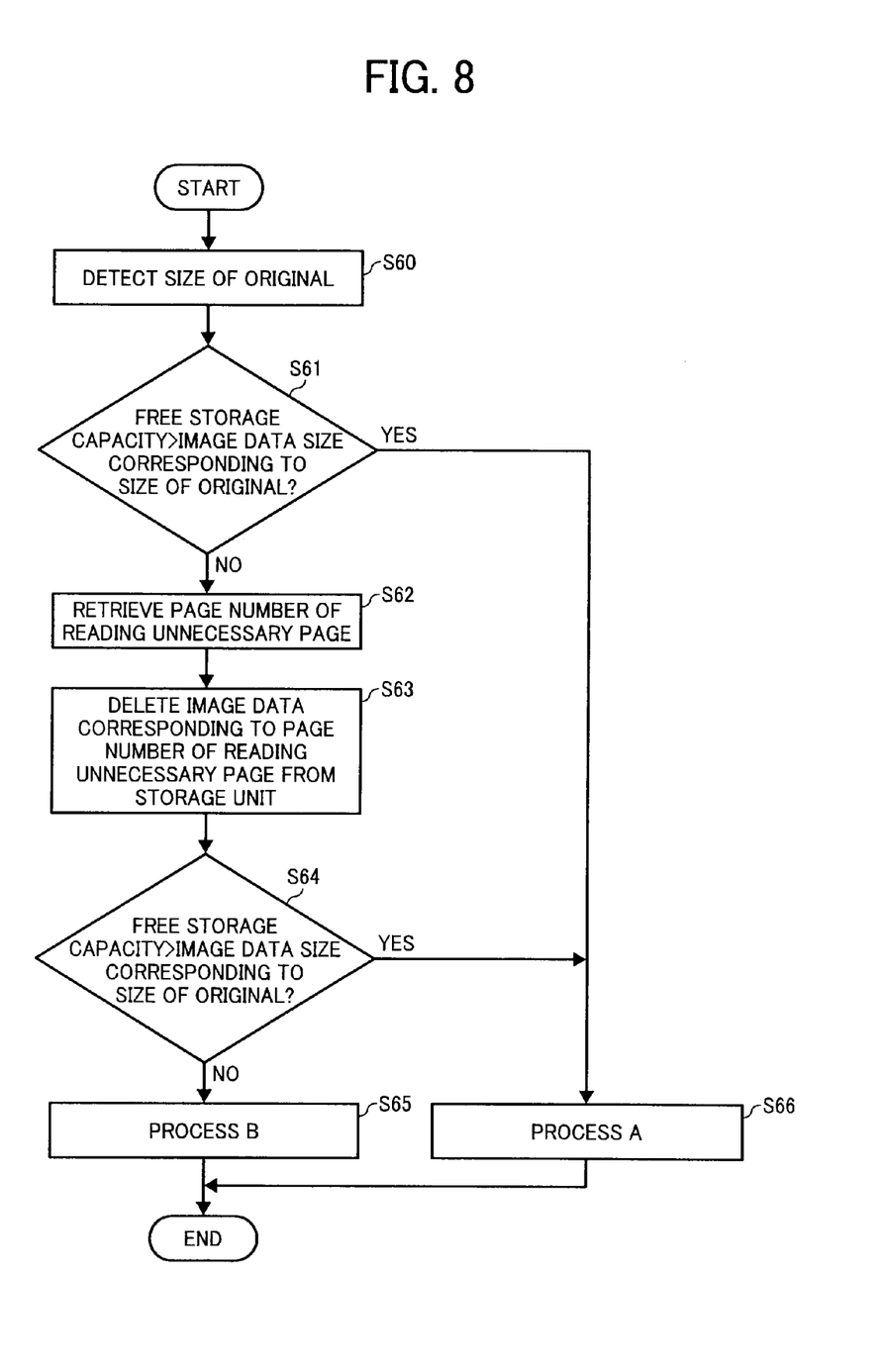
FIG. 8 is a flowchart of an image data deleting process performed by the MFP shown in FIG. 7.

An image data deleting process performed by the MFP 400 is explained next. FIG. 8 is a flowchart of the image data deleting process performed by the MFP 400.

First, the detector 429 detects the size of the original that is placed in the placing unit (Step S60). Next, the capacity determining unit 430 determines whether the free storage capacity of the storage unit 310 is greater than the image data size corresponding to the detected size of the original (Step S61). If the free storage capacity of the storage unit 310 is greater than the image data size corresponding to the detected size of the original (Yes at Step S61), the reader 421 executes a reading process of the original using the process A (Step S66)

If the free storage capacity of the storage unit 310 is smaller than the image data size corresponding to the detected size of the original (No at Step S61), the deleting unit 328 retrieves the page number of the reading unnecessary page that is stored in the storage unit 310 (Step S62). If the image data, which is stored in the storage unit 310, includes the image data corresponding to the page number of the retrieved reading unnecessary page, the deleting unit 328 deletes the image data from the storage unit 310 (Step S63).

Next, the capacity determining unit 430 determines whether the free storage capacity of the storage unit 310 is greater than the image data size corresponding to the detected size of the original (Step S64). Due to deletion of the image data at step S63, if the free storage capacity of the storage unit 310 has become greater than the image data size corresponding to the detected size of the original (Yes at Step S64), the reader 421 executes the reading process of the original using the process A (Step S66).

If the image data is not deleted at step S63 or even after deleting the image data, if the free storage capacity of the storage unit 310 is still smaller than the image data size corresponding to the detected size of the original (No at Step S64), the reader 421 executes the reading process of the original using the process B (Step S65).

The image processor 125 generates the printing data from the image data that is read from the original and the printing controller 126 controls the printer 103 to print the printing data on the sheet.

Thus, in the MFP 400, if the free storage capacity of the storage unit 310 is smaller than the image data size corresponding to the size of the original and if the read image data includes the image data corresponding to the page number of the reading unnecessary page, the image data is deleted from the storage unit 310. Therefore, the storage capacity of the storage unit 310 increases, enabling reading of the original. Further, various drawbacks, which occur due to a full memory (a total absence of the free storage capacity) resulting from saving of the image data of the reading unnecessary page, can be avoided. Thus, when temporarily storing the image data in the storage unit 310 of the MFP 400 for carrying out printing using a sorting function, carrying out a copying reservation, or carrying out a transmission reservation, only the image data that is required for the next process is saved in the storage unit 310. As a result, the storage unit 310 can function efficiently and the performance of the MFP 400 can be enhanced.

Figure 9:
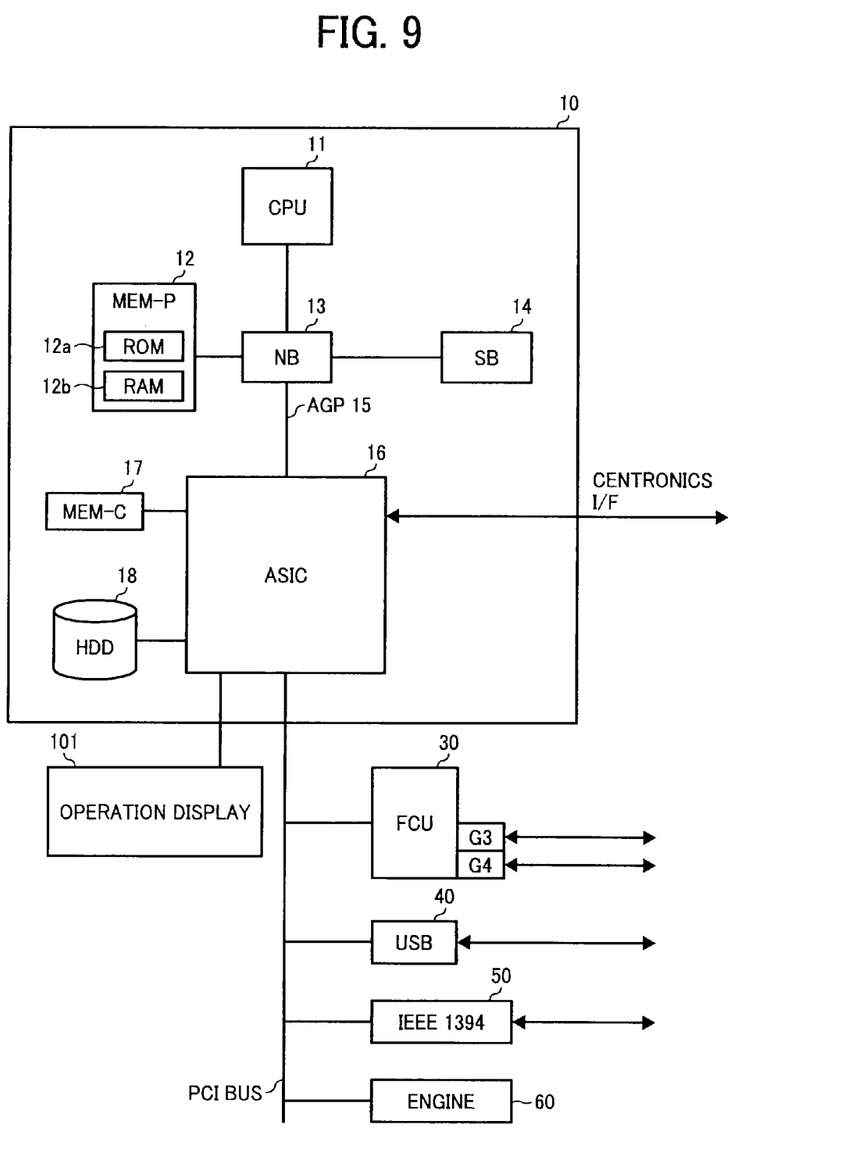
FIG. 9 is a block diagram of a hardware structure of the MFPs according to the first to the fourth embodiments.

FIG. 9 is a block diagram of a hardware structure of each of the MFPs 100 to 400 according to the first to the fourth embodiments. As shown in FIG. 9, each of the MFPs 100 to 400 includes a controller 10 and an engine 60 that are connected by a peripheral component interconnect (PCI) bus. The controller 10 controls each of the MFPs 100 to 400 and controls imaging, communication, and an input from an operating unit (not shown). The engine 60 is a printer engine that can be connected to the PCI bus. For example, the engine 60 is a black and white plotter, a single drum color plotter, a four drum color plotter, a scanner, or a fax unit. In addition to an engine portion such as the plotter, the engine 60 also includes an image processing portion such as an error diffuser or a gamma converter.

The controller 10 includes a CPU 11, a north bridge (NB) 13, a system memory (MEM-P) 12, a south bridge (SB) 14, a local memory (MEM-C) 17, an application specific-integrated circuit (ASIC) 16, and an HDD 18. The NB 13 and the ASIC 16 are connected by an accelerated graphics port (AGP) 15. The MEM-P 12 includes a ROM 12a and a RAM 12b.

The CPU 11 controls each of the MFPs 100 to 400. The CPU 11 includes a chipset that includes the NB 13, the MEM-P 12, and the SB 14. The CPU 11 is connected to other devices via the chipset.

The NB 13 connects the CPU 11 to the MEM-P 12, the SB 14, and the AGP 15. The NB 13 includes a memory controller, which controls read/write with respect to the MEM-P 12, a PCI master, and an AGP target.

The MEM-P 12 is used as a memory for storing therein computer programs and data, as a memory for expanding the computer programs and the data, and as a memory for printer imaging. The MEM-P 12 includes the ROM 12a and the RAM 12b. The ROM 12a is used as a memory for storing therein the computer programs and the data. The RAM 12b is used as a memory for expanding the computer programs and the data and as a memory for printer imaging.

The SB 14 connects the NB 13 with the PCI device and surrounding devices. The SB 14 is connected to the NB 13 via the PCI bus. A network interface (I/F) is also connected to the PCI bus.

The ASIC 16 is an IC for image processing that includes a hardware element for image processing. The ASIC 16 functions as a bridge that connects the AGP 15, the PCI bus, the HDD 18, and the MEM-C 17. The ASIC 16 includes a PCI target and an AGP master, an arbiter (ARB) that forms a core of the ASIC 16, a memory controller that controls the MEM-C 17, a plurality of direct memory access controllers (DMAC) that carry out rotation of the image data using hardware logic, and a PCI unit that carries out data transfer between the ASIC 16 and the engine 60 via the PCI bus. A fax control unit (FCU) 30, a universal serial bus (USB) 40, an institute of electrical and electronics engineers 1394 (IEEE 1394) I/F 50 are connected to the ASIC 16. The operation display 101 is directly connected to the ASIC 16.

The MEM-C 17 is a local memory that is used as an image buffer for copying and as a code buffer. The HDD 18 is a storage unit for storing therein the image data, the computer programs, font data, and a form.

The AGP 15 is a bus I/F for a graphics accelerator card that is suggested for enhancing the speed of a graphic process. The AGP 15 directly accesses the MEM-P 12 at a high throughput, thus enhancing the speed of the graphics accelerator card.

An image forming program, which is executed by the MFPs 100 to 400, is provided by prior embedding the image forming program in a ROM etc.

The image forming program can also be provided by recording the image forming program as a file of installable format or executable format in a computer readable-recording medium such as a CD-ROM, an FD, a CD-R, or a DVD.

The image forming program can also be stored in a computer that is connected to a network such as the Internet, and can be provided by downloading the image forming program via the network. Further, the image forming program can be provided or distributed via the network such as the Internet.

The image forming program includes a modular structure that includes each component mentioned above (the readers 121 and 421, the embedded data determining units 122 and 222, the embedded data extracting unit 123, the page number determining unit 124, the image processor 125, the printing controller 126, the page number extracting unit 327, the deleting unit 328, the detector 429, and the capacity determining unit 430). In actual hardware, a CPU (processor) reads the image forming program from the ROM and executes the image forming program. Due to this, each component mentioned above is downloaded on a main storage device and the readers 121 and 421, the embedded data determining units 122 and 222, the embedded data extracting unit 123, the page number determining unit 124, the image processor 125, the printing controller 126, the page number extracting unit 327, the deleting unit 328, the detector 429, and the capacity determining unit 430 are generated on the main storage device.

According to an aspect of the present invention, a reading process of an original is carried out based on a page number of a reading unnecessary page that is included in embedded data that has been embedded in image data. Therefore, an operation to place only necessary pages of the original can be omitted. Thus, work efficiency of a user can be enhanced and performance of the image forming apparatus can also be enhanced by reading only image data of the necessary pages.

Furthermore, according to another aspect of the present invention, based on the page number of the reading unnecessary page in the embedded data, the image data of the reading unnecessary page is deleted from the already read image data. Therefore, performance of the image forming apparatus can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a scanner that scans, sequentially page by page, an original document having a plurality of pages;
   a reading unit that reads the original document that is scanned by the scanner as image data;
   an acquiring unit that acquires page information from the image data that is read by the reading unit; and
   a control unit that performs a control, based on the page information that is acquired by the acquiring unit and an order of the pages of the original document that are sequentially scanned by the scanner, of whether to cause the reading unit to read the original document that is scanned by the scanner as the image data.

2. The image forming apparatus according to claim 1, wherein
   the acquiring unit acquires the page information from a page of the image data that is ready by the reading unit, and
   the control unit determines whether a page number included in the page information matches with a page number of a page subsequent to the page from which the page information is acquired by the acquiring unit and, if the page numbers match with each other, stops reading the image data that corresponds to the subsequent page.

3. The image forming apparatus according to claim 1, wherein
the acquiring unit extracts embedded information from the image data that is read by the reading unit and acquires the page information based on the embedded information that is extracted from the image data.

4. An image forming apparatus comprising:
a storage unit;
a scanner that scans, sequentially page by page, an original document having a plurality of pages;
a reading unit that reads the original document that is scanned by the scanner as image data and stores the image data in the storage unit;
an extracting unit that extracts a page number from the image data that is read by the reading unit;
an acquiring unit that acquires page information from a page of the image data that is read by the reading unit; and
a deleting unit that deletes the image data from the storage unit by referring to the page information that is acquired by the acquiring unit and the page number that is extracted by the extracting unit, wherein
the page information includes any page number other than the page number of the page from which the page information is acquired.

5. The image forming apparatus according to claim 4, wherein
the extracting unit stores the extracted page number in the storage unit in associated with the image data that is read by the reading unit, the image forming apparatus further comprising:
a control unit that makes a control of determining whether the page number included in the page information that is acquired by the acquiring unit matches with the page number of the image data that is stored in the storage unit, wherein
the deleting unit deletes, from the storage unit, the image data that corresponds to the matched page number.

6. The image forming apparatus according to claim 4, wherein
the acquiring unit extracts embedded information from the image data that is read by the reading unit and acquires the page information based on the embedded information that is extracted from the image data.

7. A method comprising:
scanning, by a scanner, sequentially page by page, an original document having a plurality of pages;
reading, by a reading unit the original document that is scanned by the scanner as image data;
an acquiring unit that acquires page information from the image data that is read by the reading unit; and
performing a control, by a control unit, based on the page information that is acquired by the acquiring unit and an order of the pages of the original document that are sequentially scanned by the scanner, of whether to cause the reading unit to read the original document that is scanned by the scanner as the image data.

8. A method comprising:
scanning, by a scanner, sequentially page by page, an original document having a plurality of pages;
reading, by a reading unit, the original document that is scanned by the scanner as image data and stores the image data in a storage unit;
extracting, by an extracting unit, a page number from the image data that is read by the reading unit;
acquiring, by an acquiring unit, page information from a page of the image data that is read by the reading unit; and
deleting, by a deleting unit, the image data from the storage unit by referring to the page information that is acquired by the acquiring unit and the page number that is extracted by the extracting unit, wherein
the page information includes any page number other than the page number of the page from which the page information is acquired.

9. A non-transitory computer readable storage medium having instructions stored therein, which when executed by a processor in an image forming apparatus, causes the processor to execute a method comprising:
scanning, by a scanner, sequentially page by page, an original document having a plurality of pages;
reading, by a reading unit the original document that is scanned by the scanner as image data;
an acquiring unit that acquires page information from the image data that is read by the reading unit; and
performing a control, by a control unit, based on the page information that is acquired by the acquiring unit and an order of the pages of the original document that are sequentially scanned by the scanner, of whether to cause the reading unit to read the original document that is scanned by the scanner as the image data.

10. A non-transitory computer readable storage medium having instructions stored therein, which when executed by a processor in an image forming apparatus, causes the processor to execute a method comprising:
scanning, by a scanner, sequentially page by page, an original document having a plurality of pages;
reading, by a reading unit, the original document that is scanned by the scanner as image data and stores the image data in a storage unit;
extracting, by an extracting unit, a page number from the image data that is read by the reading unit;
acquiring, by an acquiring unit, page information from a page of the image data that is read by the reading unit; and
deleting, by a deleting unit, the image data from the storage unit by referring to the page information that is acquired by the acquiring unit and the page number that is extracted by the extracting unit, wherein
the page information includes any page number other than the page number of the page from which the page information is acquired.

* * * * *